United States Patent
Cotner et al.

(10) Patent No.: US 6,990,477 B2
(45) Date of Patent: Jan. 24, 2006

(54) METHOD, SYSTEM, AND PROGRAM FOR IMPLEMENTING SCROLLABLE CURSORS IN A DISTRIBUTED DATABASE SYSTEM

(75) Inventors: Curt Lee Cotner, Gilroy, CA (US); Margaret A. Dong, San Jose, CA (US)

(73) Assignee: International Business Machines Corporation, Armowk, NY (US)

(*) Notice: Subject to any disclaimer, the term of this patent is extended or adjusted under 35 U.S.C. 154(b) by 592 days.

(21) Appl. No.: 09/819,476

(22) Filed: Mar. 28, 2001

(65) Prior Publication Data

US 2002/0143728 A1 Oct. 3, 2002

(51) Int. Cl.
*G06F 17/30* (2006.01)

(52) U.S. Cl. .......................................... 707/1
(58) Field of Classification Search ............. 707/1, 707/3, 8, 10, 101, 102, 203; 395/200.33, 395/200.53, 200.57; 345/823, 830; 709/201, 709/208
See application file for complete search history.

(56) References Cited

U.S. PATENT DOCUMENTS

| | | | |
|---|---|---|---|
| 4,190,835 A | | 2/1980 | Buynak |
| 4,434,475 A | | 2/1984 | McCaskill et al. |
| 5,410,693 A | | 4/1995 | Yu et al. |
| 5,412,805 A | | 5/1995 | Jordan, II et al. |
| 5,446,858 A | | 8/1995 | Copeland et al. |
| 5,581,275 A | | 12/1996 | Glei et al. |
| 5,739,817 A | | 4/1998 | Glei et al. |
| 5,835,904 A | * | 11/1998 | Vicik et al. ............... 707/1 |
| 5,918,224 A | * | 6/1999 | Bredenberg ............... 707/2 |
| 5,926,807 A | * | 7/1999 | Peltonen et al. .......... 707/3 |
| 5,930,793 A | * | 7/1999 | Kleewein et al. ......... 707/10 |
| 5,974,416 A | * | 10/1999 | Anand et al. ............. 707/10 |
| 6,256,626 B1 | | 7/2001 | Dong et al. ............... 707/3 |
| 6,606,618 B2 | * | 8/2003 | Delo ........................ 707/2 |
| 2002/0040639 A1 | * | 4/2002 | Duddleson et al. ....... 92/52 |

OTHER PUBLICATIONS

IBM, "DB2 for MVS/ESA Version 4 Administration Guide", IBM Document No. SC26–3265–00, 1982, pp. 1–7, [online] Sep. 2000, Retrieved from the Internet at <URL: http:///publibfp.boulder.ibm.com>.

(Continued)

*Primary Examiner*—Safet Metjahic
*Assistant Examiner*—Etienne P Leroux
(74) *Attorney, Agent, or Firm*—David W. Victor; Konrad, Raynes & Victor LLP

(57) ABSTRACT

Provided is a method, system, and program for accessing data in a distributed database environment. A client program receives multiple requests for data from a database object satisfying specified search predicates from an application program. Each request includes a request for at least one row from the table. The client program transfers a database command and a rowset parameter indicating a maximum number of rows to return to a server program over a network if the requested row is not maintained by the client program. A data block is generated with the server program including rows from the database object satisfying the search predicates in response to the database command. The rows included in the data block do not exceed the rowset parameter. The server program transfers the data block to the client program. In turn, the client program returns at least one requested row from the received data block in response to one request for the at least one row of data from the application program.

64 Claims, 8 Drawing Sheets

OTHER PUBLICATIONS

The Open Group, "DRDA Version 2, vol. 1: Distributed Relational Database Architecture (DRDA)", The Open Group Technical Standard, 1999, pp. 31–36, 76–134, 261–334.

The Open Group, "DRDA Version 2, vol. 3: Distributed Data Management (DDM) Architecture", The Open Group Technical Standard, 1999, pp. 378–383, 385, 428–438, 514–523, 621–625.

Boykin, J.R. et al., "IBM Technical Disclosure Bulletin: Updateable Scrollable Cursors", vol. 36 No. 4, Apr. 1993; pp. 263–268.

Boykin, J.R., et al., "IBM Technical Disclosure Bulletin: New Options for FETCH in SQL," vol. 36, No. 06A, Jun. 1993; pp. 559–560.

Boykin, J.R., et al., "IBM Technical Disclosure Bulletin: Orderable, Updatable, Scrollable Structure Query Language Cursors," vol. 38, No. 17, Jul. 1995; pp. 393–394.

IBM Corp., "Distributed Data Management Architecture: General Information; Level 4," IBM Document No. GC21-9257-03; 1986, 1993; pp. 1–69; retrieved from Internet at http://publibfp.boulder.ibm.com.

IBM Corp., "Distributed Data Management (DDM) Architecture Reference Manual; Level 4," IBM Document No. SC21-9526-05; 1986, 1993; 15 selected pages; retrieved from Internet at http://publibfp.ibm.com.

\* cited by examiner

FIG. 2
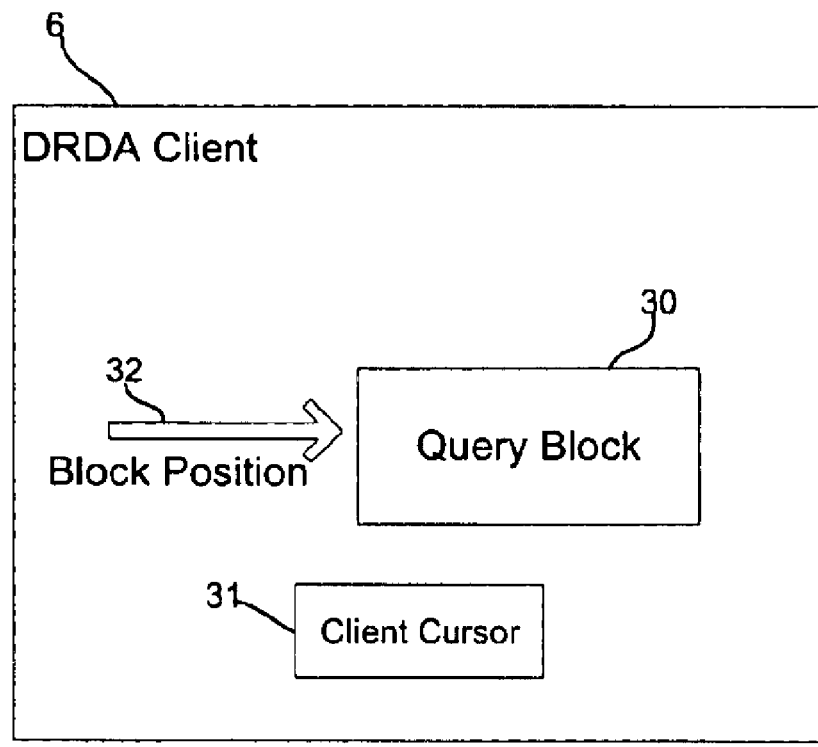
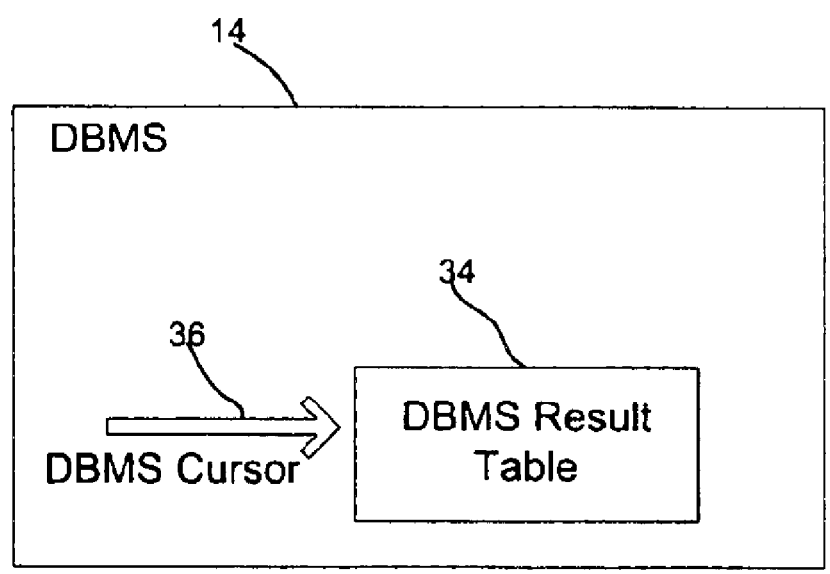

METHOD, SYSTEM, AND PROGRAM FOR IMPLEMENTING SCROLLABLE CURSORS IN A DISTRIBUTED DATABASE SYSTEM

BACKGROUND OF THE INVENTION

1. Field of the Invention

The present invention relates to a method, system, and program for implementing scrollable cursors in a distributed database system.

2. Description of the Related Art

Prior art database programs include a feature referred to as cursors. A cursor is a named control structure used by an application program to point to a row of interest within some set of rows and to retrieve rows from the set, possibly making updates and deletions. A cursor points to rows from a database table that satisfy a structured query language (SQL) query against the table. The rows in the table that satisfy the SQL query comprise a result table of data. The SQL query includes an SQL SELECT statement and a WHERE clause to qualify rows according to a predicate. An application can then access data on a row-by-row basis from the result table.

When a cursor is opened or initialized, the current row position (current cursor position) is before the first row in the result table. The application program may issue fetch commands to move the current row position (current cursor position) and retrieve row data. Cursors are described in SQL099 standard and also the Open Database Connectivity (ODBC) architecture. Cursors may be updateable or non-updateable (read-only). An updateable cursor allows the application program to update or delete the row at the current cursor position—this is known as updating or deleting through the cursor. A non-updateable (read-only) cursor does not allow the application program to perform such operations.

Cursors may be serial (non-scrollable) or scrollable. A serial (or non-scrollable) cursor is one that only allows the application to move forward through the result table. A scrollable cursor is one that allows the application program to move both forward and backward through the result table. Fetching forward in the result table increases the current cursor position while fetching backward decreases the current cursor position.

Cursors may be insensitive or sensitive to updates. An insensitive cursor is one that does not show updates made to the underlying data for the cursor, whether the update is made through the cursor or by other concurrent processes. Otherwise, the cursor is sensitive to updates. There may be degrees of sensitivity defined by the implementation, but this patent does not distinguish degrees of sensitivity. Fetches against the cursor may be single-row fetches or multi-row fetches. A single-row fetch returns only one row in response to the fetch request. A multi-row fetch returns a specified number of rows in response to the fetch. It is possible for a database system to support single-row fetching without supporting multi-row fetching.

In a distributed relational database environment, an application program at a client computer may request a cursor from a database at a server computer. In the current art, the Distributed Relational Database Architecture (DRDA) specifies a protocol for a client computer to open a cursor and request data from a cursor result table from a database at a server. Because the overhead of communicating across the network is high, DRDA clients and servers attempt to minimize the number of messages they exchange. In the current art, when a DRDA server receives a single-row fetch request for a read-only non-scrollable cursor, it fetches ahead additional rows and returns all the fetched rows in a single buffer, known as a query block. The query block is of a size negotiated between the client and the server. Because the application can only move forward sequentially through the cursor, when the client receives the query block, it satisfies the application requests for rows from the cursor by reading the locally available query block, thus saving additional message flows across the network. The protocol is known in DRDA as Limited Block Query Protocol. For updateable non-scrollable cursors, fetching ahead is not possible since a row may be updated after it has been prefetched by the server but before it has been fetched by the application. In this case, the DRDA Fixed Row Query Protocol is used. If the client and/or the server support only single-row fetch, this typically means that each remote fetch request retrieves one row of data at a time.

When an application presents a window to a user displaying rows of data and allows the user to scroll forward and backwards, scrollable cursors are the most appropriate structure by which to implement the application. Typically, these modem windowing applications are interactive, requiring quick responses to actions in the window. Techniques used in prior art database systems introduce performance or concurrency problems for such scrollable cursor applications. For instance, the client application may frequently change the cursor position within the window. In such case, the client cannot practically communicate with the server each time the client's window position is changed. Updateable cursors often employ techniques like DRDA Fixed Row Protocol to send only one row per network transmission. This guarantees the server data is unchanged between the fetch operation and any subsequent update. However, the network transmission overhead for this approach is prohibitive for query answer sets of any reasonable size. "Wide" cursors that fetch multiple rows on a single operation alleviate the network performance problems, but introduce concurrency problems because all of the rows within the cursor are locked for updateable queries.

Thus, there is a need in the art to provide an improved method for fetching cursor data in a client/server environment.

SUMMARY OF THE PREFERRED EMBODIMENTS

Provided is a method, system, and program for accessing data in a distributed database environment. A client program receives multiple requests for data from a database object satisfying specified search predicates from an application program. Each request includes a request for at least one row from the table. The client program transfers a database command and a rowset parameter indicating a maximum number of rows to return to a server program over a network if the requested row is not maintained by the client program. A data block is generated with the server program including rows from the database object satisfying the search predicates in response to the database command. The rows included in the data block do not exceed the rowset parameter. The server program transfers the data block to the client program. In turn, the client program returns at least one requested row from the received data block in response to one request for the at least one row of data from the application program.

In further embodiments, the server program maintains a maximum block size parameter, and wherein the data block is further generated to not exceed the block size parameter.

In still further embodiments, the multiple requests received by the client program from the application program comprise single-row fetch requests.

Still further, the client program and server program may communicate using the Distributed Relational Database Architecture (DRDA). In such case, the database command transferred by the client program could comprises an open query command or a continue query command for rows from an open cursor.

Preferred embodiments provide a technique for scrollable cursors to allow fetching ahead rows to return to an application program that the application program will request in subsequent data requests. A client program local to the application implementing the scrollable cursor would request a remote server program over a network to fetch multiple rows from a database object, such as a table or index. The client program could then service requests from the application program for data locally from the multiple fetched rows. Preferred embodiments are particularly useful for situations where the application program issues single-row fetch requests, such as the case with scrollable cursors. With the preferred embodiments, the client program does not have to issue requests to the remote server program over the network in response to each single-row fetch request, but can instead service scrollable cursor single row fetch requests from multiple rows the client program fetched in advance.

The described implementations provide an improved method for fetching cursor data in a client/server environment when the cursor presented to the application is capable of only single-row fetch operations, but the underlying client and database system implementation is capable of exploiting multiple-row network transmissions and perform scrolling operations without frequent network interactions with the server. The improved method for fetching cursor data is capable of supporting scrollable cursors that are either updateable or read-only.

Further, the described implementations optimize performance of scrollable cursor applications that use a single-row cursor interface (both read-only cursors and updateable cursors) by implementing client/server network protocols that allow the server to send a block of rows on each network transmission (rather than one row at a time for updateable cursors) in order to minimize network traffic by reducing the number of requests. The described implementations also allow the client to scroll back and forth within the block of rows without interacting with the server. In fact, network communication between the client and server is not necessary as long as the scroll operation at the client is contained within the block of rows currently resident at the client. This aspect provides optimal client scrolling performance by allowing the client to operate on the rows "cached" at the client without notifying the server.

Still further, the described implementations allow the client to resynchronize the cursor position at the server when the client needs a new block of rows. This allows the client to reposition the server's current position. This addresses the situation when the client may have changed cursor position without previously informing the server about the cursor position change.

BRIEF DESCRIPTION OF THE DRAWINGS

Referring now to the drawings in which like reference numbers represents corresponding parts throughout:

FIG. 2 illustrates data structures used by the components in the computing environment in accordance with preferred embodiments of the present invention;

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
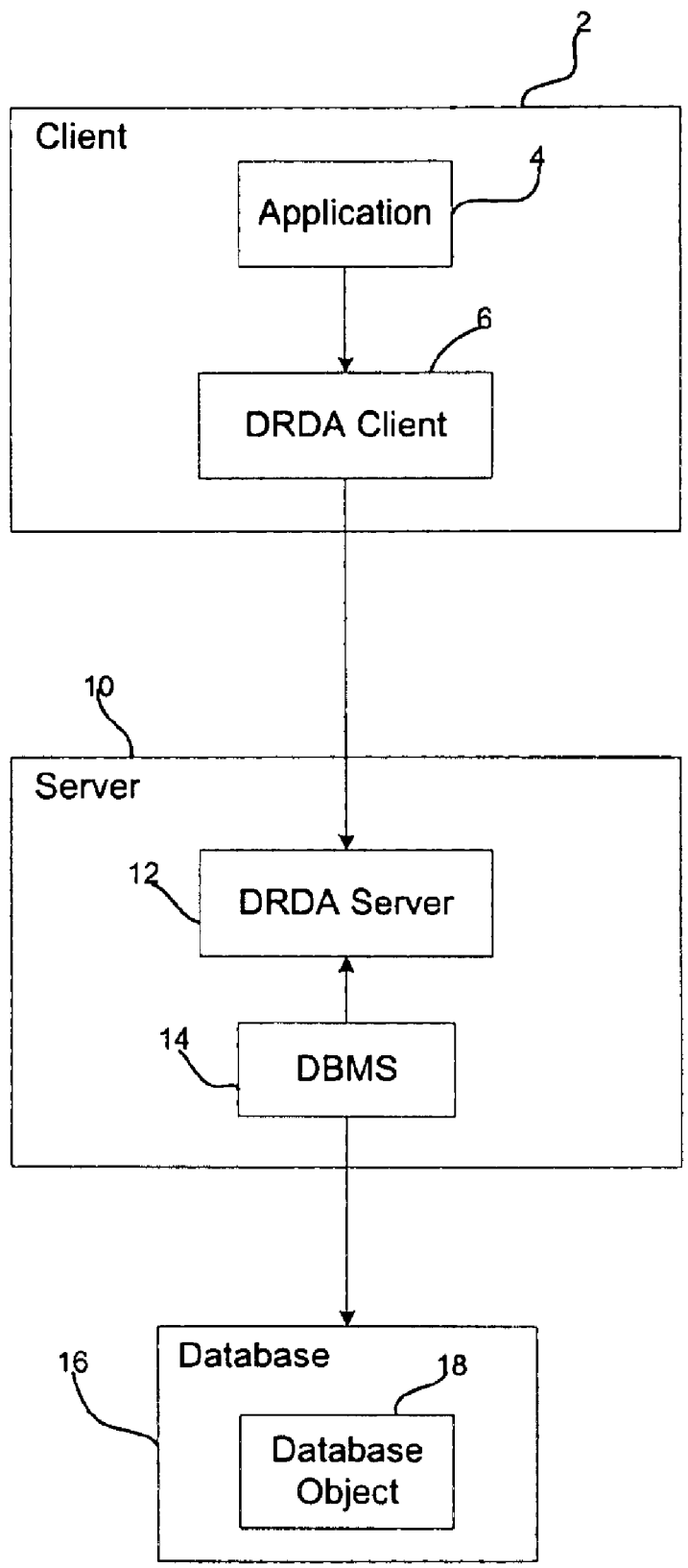
FIG. 1 illustrates a computing environment in which preferred embodiments are implemented.

FIG. 1 illustrates a distributed computing environment in which preferred embodiments are implemented. A client computer 2 includes an application program 4 and a DRDA client 6. A server computer 10 includes a DRDA server 12 and a database management system (DBMS) 14 known in the art, such as the International Business Machines Corporation DB2 database program.** The client computer 2 and server computer 10 may comprise any computer system known in the art, such as a server, workstation, personal computer, mainframe, etc. The application program 4 may comprise any application program that is capable of issuing scrollable cursor commands. The DRDA client 6 and DRDA server 12 comprise DRDA client/server software known in the art for handling distributed database commands across clients and servers. Details of the DRDA client/server protocol for allowing data on one system to be shared and accessed by another system is described in the IBM publication "Distributed Data Management Architecture: General Information Level 4," having IBM document no. GC21-9527-03 (Copyright IBM, 1993) and the Open Group Technical Standards entitled "DRDA, Version 2, Volume 3: Distributed Data Management (DDM) Architecture", document no. C913 (Copyright The Open Group, 1993) and "Distributed Relational Database Architecture (DRDA), Version 2, Volume 1 (Copyright The Open Group, 1999), which publications are incorporated herein by reference in their entirety.

** DB2 is a registered trademark of International Business Machines Corp.

The DBMS program 14 in the server 10 is capable of accessing a database 16 including a database object 18, such as a database table or index. In the preferred embodiments, some component in the system, such as the database engine used by the application 4 in the client 2 or the DBMS 14 in the server 10 only provide for single-row fetch support, such that the application 4 will only fetch one row at a time in order to scroll forward or backward through a result table. The application program 4 would define a scrollable cursor using a database and WHERE predicate clause indicating predicates that rows in the scrollable cursor result table must satisfy to quality as a result table row.

Preferred embodiments provide additional parameters and algorithms implemented in the DRDA client 6 to optimize requests for data from the DRDA server 12 when the application program 4 is fetching multiple rows using single-fetch commands. In preferred embodiments, the application 4 requests to fetch one or more rows from a result table. The application 4 may specify one of the following types of FETCH request to fetch rows from a result table that satisfy predicates provided when defining a cursor or scrollable cursor.

NEXT: positions the cursor on the next row of the result table 34 relative to the current cursor position and fetches the row. NEXT is the default.

PRIOR: positions the cursor on the previous row of the result table 34 relative to the current cursor position and fetches the row.

FIRST: positions the cursor on the first row of the result table 34 and fetches the row.

LAST: positions the cursor on the last row of the result table 34 and fetches the row.

CURRENT: fetches the current row.

BEFORE: positions the cursor before the first row of the result table 34.

AFTER: positions the cursor after the last row of the result table 34.

ABSOLUTE: Evaluates the host variable or integer constant to an integral value k, and then moves the cursor position to the kth row in the result table 34 if k>0 or to k rows from the bottom of the table if k<0 and fetches the row.

RELATIVE: Evaluates the host variable or integer constant to an integral value k, and then moves the cursor position to row in the result table 34 k rows after the current row if k>0 or to k rows before the current row if k<0 and fetches the row.

FIG. 2 illustrates further data structures maintained by the DRDA client 6 to implement the preferred embodiments. The DRDA client 6 maintains the query block 30 that include the rows in the rowset that the DRDA server 12 fetched via the DBMS 14 from the database object 18 and returned to the DRDA client 6. The DRDA client 6 further maintains a client cursor position value 31 indicating the cursor position the application 4 last accessed and a block position 32 that indicates the next row to parse when searching for the next row the application 4 fetches from the client query blocks 30. In this way, the client query blocks 30 buffer the rows fetched from the actual database object 18 that were returned in query blocks from the DRDA server 12.

Figure 3:
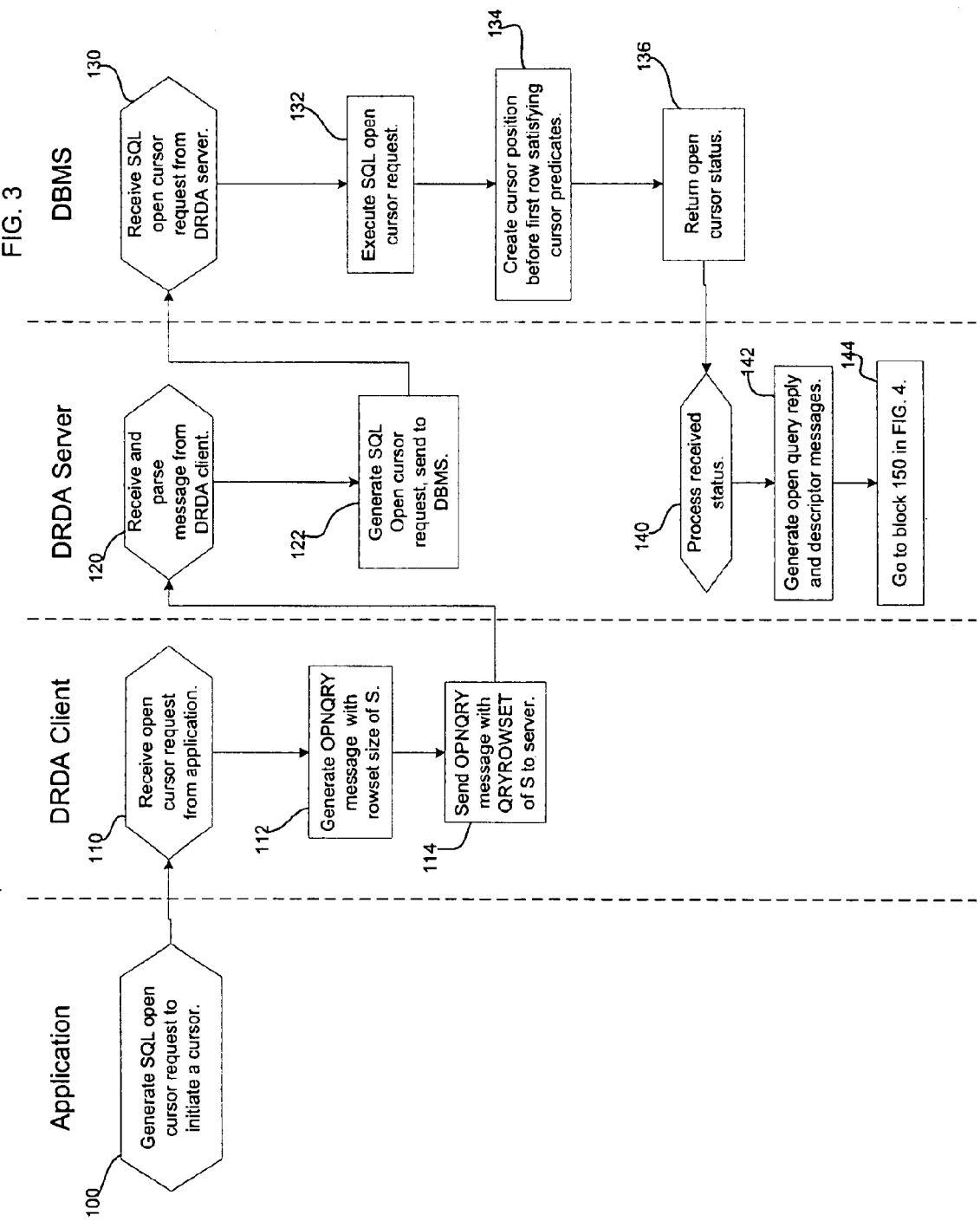
FIGS. 3–5 illustrate logic implemented by the components in the computing environment to return requested data to an application program in accordance with preferred embodiments of the present invention.
Figure 4:
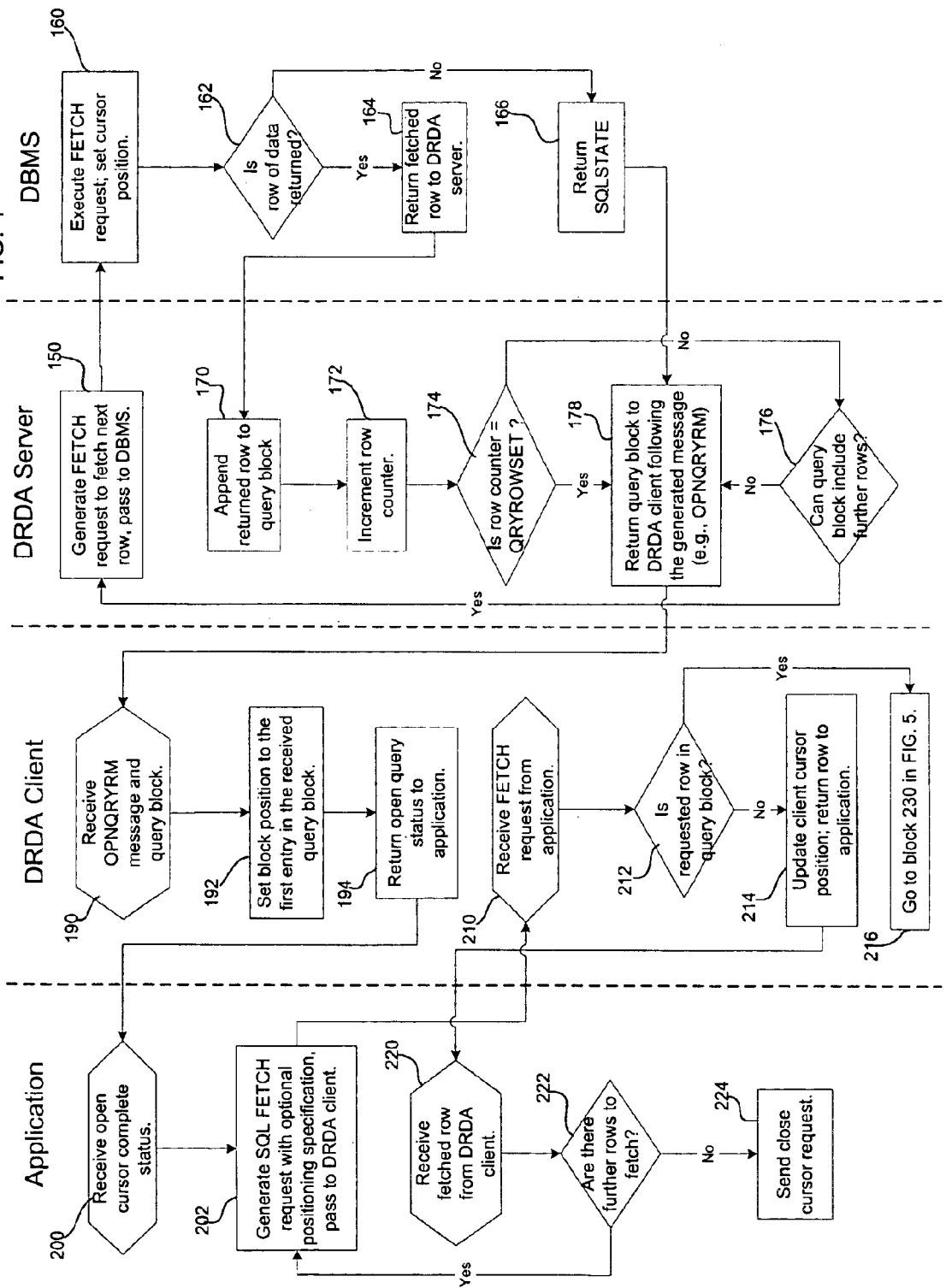
Figure 5:
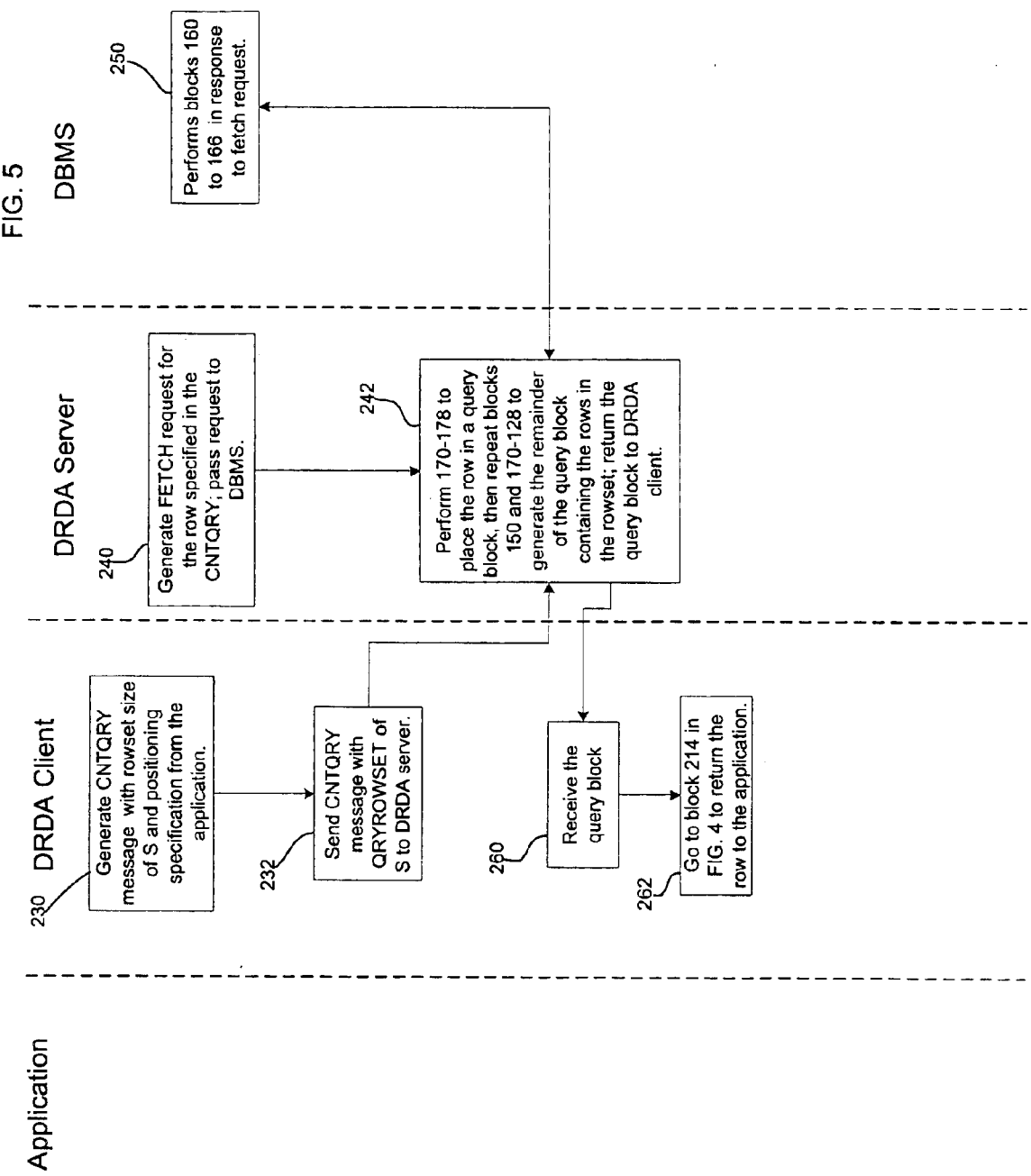

The DBMS 14 maintains a DBMS result table 34, which is the result table maintained by the DBMS 14 that includes those rows in the database object that satisfy the cursor search predicates. The DBMS cursor 36 points to the last row in the DBMS result table 36 returned to the DRDA server 12. Thus, both the DRDA client 6 and the DBMS 14 in the server 10 maintain knowledge about the current cursor position, where the client cursor position 31 is the last row fetched by the application 4 and the DBMS cursor 36 is the last row fetched by the DRDA server 12. Since the DRDA server 12 fetches ahead of the application 4, these two values may be different at any given time. FIGS. 3, 4, and 5 illustrate logic implemented in the DRDA client 6 and DRDA server 12 to provide an improved technique for fetching across a network using the DRDA protocol when the application 4 or DBMS 14 is only capable of single-row fetch operations and not multi-row fetch operations.

Upon receiving an SQL OPEN CURSOR request to initialize a scrollable cursor in the database object 18 for application 4, the DRDA client 6 would then generate an OPNQRY message to send to the DRDA server 12. Upon receiving an SQL FETCH request to fetch rows from the result table for the scrollable cursor, the DRDA client 6 would generate a (continue query) CNTQRY message to send to the DRDA server 12. In the preferred embodiments, the DRDA client 6 would specify a rowset parameter (QRYROWSET) indicating a number of rows to retrieve from the database 16 via DRDA server 12, allowing each message to request that multiple rows be sent by the DRDA server 12 to the DRDA client 6 even though only single-row fetches are supported for the cursor. The rowset parameter (QRYROWSET) is used by the DRDA client 6 to indicate on the OPNQRY or CNTQRY message the maximum number of rows satisfying the query predicates of the cursor to be returned by the DRDA server 12 in response to the message. The rows requested by the DRDA client 6 constitute a rowset, comprising one or more query blocks. A query block, containing cursor data for at least one row, is the basic unit of transmission for cursor data in the DRDA protocol, where the size of each query block (QRYBLKSZ) and the number of additional query blocks (MAXBLKEXT) beyond those needed to transmit at least one row is negotiated between the DRDA client 6 and the DRDA server 12.

A large row may span multiple query blocks, if the query block size is small relative to the row size. If extra query blocks are supported (MAXBLKEXT greater than zero), then more than one query block may be returned. In this discussion, it is assumed that multiple rows can fit into a query block and only one query block is returned for each message as other variations are easily understood from this case. The rows returned by the DRDA server 12 may be a complete rowset or a partial rowset. A complete rowset is one that contains all the rows requested by the QRYROWSET parameter, until the end of the result table is encountered. A partial rowset is returned if negotiated limits for query block size and the number of additional query blocks prevent the return of all the rows requested. Because the DRDA server 12 fetches ahead of the application 4, the client cursor position 31 known to the application 4 may be different from the cursor position 36 maintained by the DBMS 14 at any given time.

Further, since the number of rows returned in response to an OPNQRY or CNTQRY message is dependent on the size of each row retrieved, the query block size, and the particular extra query block implementation of the DRDA server 12, the DRDA client 6 does not know which rows are contained in the query block(s) nor does it know the cursor position 36 maintained by the DBMS 14 without parsing the entire returned query block(s). Finally, the FETCH requests generated by the application 4, along with any orientation specifications, are relative to the client cursor position 31 of the application, and not the value of the cursor position 36 maintained by the DBMS 14. In such implementations, the DRDA client 6 manages the differences between the client cursor position 31 and the cursor position 36 at the DBMS 14. In certain implementations, the DRDA client 6 could enforce a requirement that for every rowset retrieved from the DRDA server 12, the application 4 must fetch every row in the rowset before another rowset is retrieved from the DRDA server 12. If this requirement is not enforced, then other methods may be employed by the DRDA client 6 to map between the fetch request generated by the application 4 and the correct behavior at the DBMS 14. In this description, for illustration purposes, the DRDA client 6 is assumed to maintain the absolute row position fetched by the application and all CNTQRY request that are dependent on the current position 36 at the DBMS 14 are mapped to FETCH ABSOLUTE requests.

In addition, it is assumed that all rowsets retrieved are complete in FIGS. 3, 4, and 5. Details concerning partial rowsets processing are provided in the discussion with respect to FIGS. 7, 8, and 9 below. In certain implementations, messages exchanged between the DRDA client 6 and the DRDA server 12 conform to the DRDA limited block query protocol (LMTBLKPRC) or the fixed row query protocol (FIXROWPRC). However, alternative query protocols may be utilized, such as the continuous block fetch protocol or any other block transfer protocol known in the art.

The application 4 and DBMS 14 would perform fetch operations in a manner known to the art, which would trigger the logic described in FIGS. 3, 4, and 5 to access the rows from the DRDA server 16. With respect to FIG. 3, control begins at block 100 with the application 4 generating an SQL open cursor request (OPEN CURSOR) to initiate a scrollable cursor. The DRDA client 6 receives (at block 110) the open cursor request and, in response, generates (at block 112) a DRDA open query message (OPNQRY) to initiate a scrollable cursor with a rowset size (QRYROWSET) of S. Providing a rowset may be optional. The DRDA client 6 then sends (at block 114) the generated OPNQRY message with the QRYROWSET parameter to the DRDA server 12. At block 120, the DRDA server 12 receives and parses the message from the DRDA client 6. In response, the DRDA server 12 generates (at block 122) an SQL open cursor request, which is passed to the DBMS 14 across a program interface in the server 10. At block 130, the DBMS 14 receives (at block 130) the SQL open cursor request from the DRDA server 12 and executes (at block 132) the SQL open cursor request in a manner known in the art. In opening the cursor, the DBMS 14 creates (at block 134) the DBMS cursor 36 positioned before the first row that satisfies the cursor query predicates specified with the open cursor request. The DBMS 14 then returns (at block 136) to the DRDA server 12 the status of the open cursor operation. The DRDA server 12 receives (at block 140) and processes the open cursor complete status. The DRDA server 12 generates (at block 142) an open query reply message and a descriptor message that will eventually be sent to the DRDA client 4. The DRDA server 12 begins the process of accessing rows in the DBMS result table 34 to include in a query block to send to the DRDA client 6. In this way, the DRDA client 6 can respond to single-row or multi-row FETCH requests from the application 4 from the multiple rows from the result table 34 returned in the query block 30.

The DRDA server 12 (at block 176) adheres to DRDA block rules in determining if there is sufficient room in the query block containing the open query reply message and descriptor message to contain none of, all of, or only a portion of the first row. In certain implementations, the first row is not appended to the query block if the query block cannot contain the whole row. However, other variations are also possible. Assuming that there is room in the query for the first row, the DRDA server 12 generates (at block 150 in FIG. 4) an SQL FETCH request to fetch the next row in the result table and passes the request to the DBMS 14. In response to receiving the FETCH request from the DRDA server 12, the DBMS 14 executes (at block 160) the FETCH to move the cursor 36 to the next qualifying row in the database object 18. If (at block 162) a row (or the SELECT columns) is returned, then the DBMS 14 returns (at block 4) the fetched row to the DRDA server 12. Otherwise, if the end of the database object 18 has been reached, then a status is returned with an SQLSTATE (at block 166) indicating no further rows to fetch. When the end of the database object 18 is reached, the rows already fetched into the rowset by the DRDA server 12 constitute a complete rowset. Otherwise, the rowset is incomplete and the DRDA server 12 continues to fetch into the rowset until it is complete (either the number of rows in the rowset is equal to the requested QRYROWSET or the end of the database object 18 is reached) or an error occurs when fetching yielding an error SQLSTATE for the FETCH request.

In response to receiving the returned qualifying row or selected columns in the row from the DBMS 14 at block 164, the DRDA server 12 appends (at block 170) the returned row or columns to the query block 30 being constructed to return to the DRDA client 6 and increments (at block 172) a row counter variable that is used to ensure that the number of rows appended to the query block do not exceed the specified rowset parameter (QRYROWSET). If (at block 174) the row counter is not equal to the rowset parameter (QRYROWSET), i.e., the rowset is incomplete and there are further rows to access to return the rowset parameter number of rows, then the DRDA server 12 determines (at block 176) whether another qualifying row can be added to the query block 30 without exceeding the query block size (QRYBLKSZ) of the DRDA server 12 query block and without exceeding the negotiated extra query block limits (MAXBLKEXT). If these limits are not exceeded, then control returns to block 150 to fetch the next qualifying row from the result table 34 to include in the query block 30. In preferred embodiments, the DRDA server 12 will only request a number of rows that is needed to complete the rowset size. Otherwise, if adding another row or the selected columns would exceed the limits, then the DRDA server 12 would further transmit the generated query block. In the case of an OPNQRY message, the query block would contain the open query reply message, the descriptor message, and the rows fetched for the rowset. If (at block 174) the server query block 30 includes a number of rows equal to the rowset size (i.e., row counter variable equals QRYROWSET), then the server query block is returned at block 178 to the DRDA client 6.

Upon receiving the query block (at block 190), the DRDA client 6 parses the open query reply and descriptor messages as described in the current art and sets (at block 192) the block position to the first row of data in the client query block. The client cursor position 31 is initialized to zero, indicating that no rows have been fetched by the application 4. The DRDA client 6 (at block 194) returns the open cursor complete status to the application 4. Upon receiving (at block 200) the indication that the open cursor completed successfully, the application 4 generates (at block 202) a SQL FETCH request to fetch a row in the result table and passes the request to the DRDA client 6. The fetch request passed to the DRDA client 6 may include orientation parameters, such as fetch next, forward by a relative or absolute amount, or backward by an absolute amount. At block 210, the DRDA client 6 receives the fetch request from the application 4 and determines (at block 212) if the requested row is in the query block 30 by parsing the query block and looking for the desired row or by using some other method, such as interpreting the fetch orientation parameters, to determine if the row is in the query block. If (at block 212) the requested row is in the query block 30, then the DRDA client 6 (at block 214) updates the client cursor position value and returns the row to the application 4. In this way, the DRDA client 6 services fetch requests from data prefetched by the DRDA server 12 from the database object 18. Thus, with preferred embodiments, when the DRDA client 6 only supports single-row fetching for scrollable cursors, the DRDA client 6 nevertheless can efficiently retrieve multiple rows and save on network transmission costs.

If the requested row is not in the received query block 30, then the DRDA client 6 proceeds (at block 216) to block 230 in FIG. 5 to generate a CNTQRY message with rowset size and positioning specification to indicate the desired row, taking into account any differences between the current client cursor position and the current server cursor position. Because this discussion assumes that the previous rowset was complete, the DRDA client 6 merely specifies a new rowset value to start a new rowset. At block 232, the DRDA client 6 sends the CNTQRY message to the DRDA server 12 to request the desired row. The DRDA server 12 (at block 240) generates the FETCH request for the desired row. At block 242, the DRDA server 12, builds the query block by performing blocks 170–178 in FIG. 4 to add the rows to the query block, and then repeats blocks 150 and 170–178 to generate the remainder of the query blocking containing the rows in the rowset to return. At block 250, the DBMS 14 would performs steps 160–166 to fetch the rows from the result table 34 in the database object 18 and return to the database server either the fetched row or a SQLSTATE indicate that the end of the database object is reached.

After filling the query block 30 in response to the CNTQRY command with the rowset parameter specified, the DRDA server 12 returns (at block 242) the query block 30 to the DRDA client 6. In response, at block 260, the DRDA client 6 receives the query block and, at block 262, goes to block 214 to look for the desired row response in the query block, which should be there because the row was just fetched. The application 4 would perform steps 220 to 224 to fetch further data or to close the cursor. With preferred embodiments, performance is improved with database engines that only support single-row fetches because the DRDA client 6 can return requested data from a local query block 30 without having to fetch across the network for each application FETCH operation. Instead, the described implementations provide data structures and a methodology for maximizing the number of records transferred across the network in a query block, yet taking into account the possibility that an application may scroll randomly forward and backward within the cursor, thus potentially causing skipping of retrieved rows in the query block.

Figure 6:
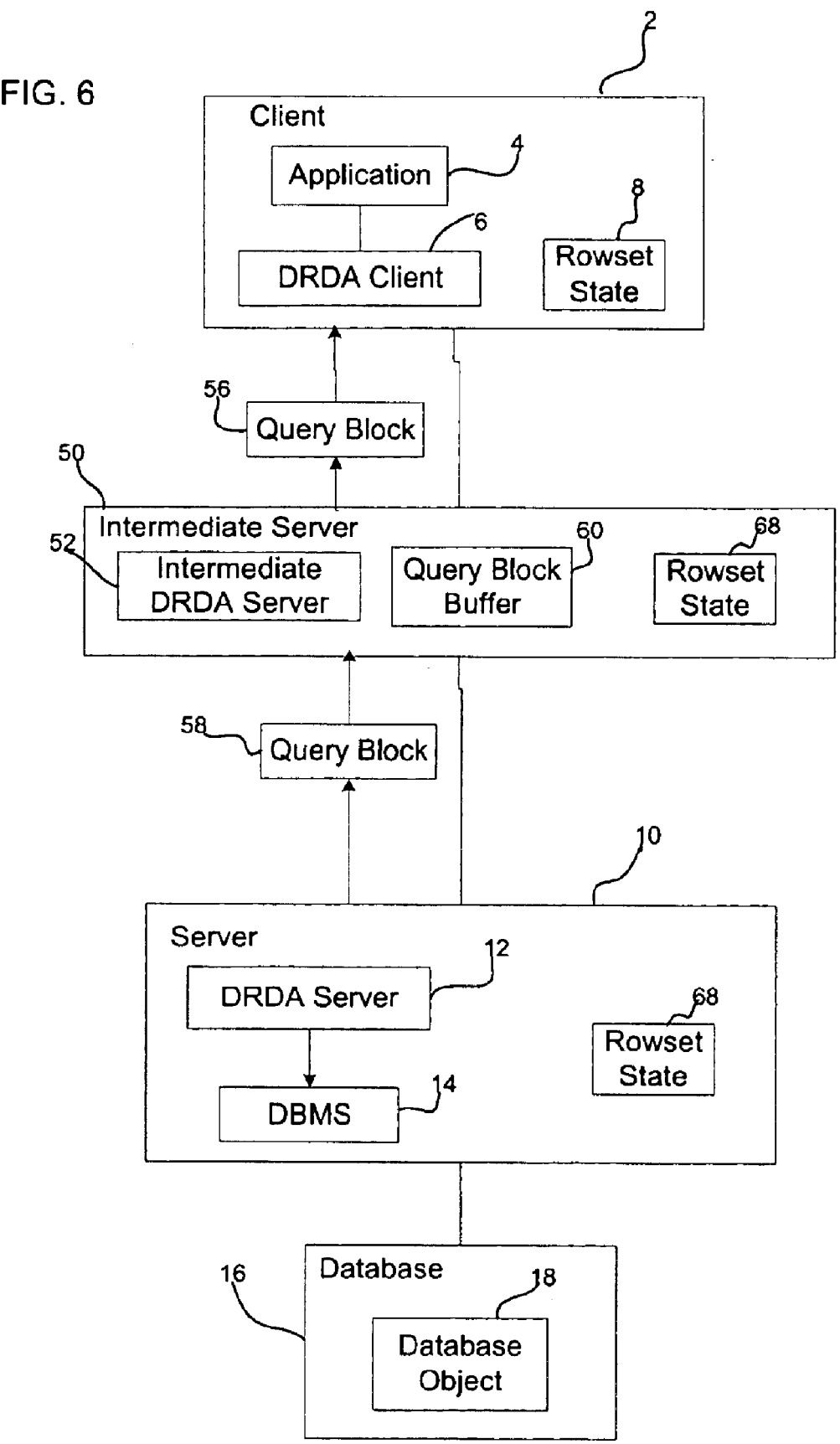
FIG. 6 illustrates a distributed computing environment in which preferred embodiments are implemented.

In the above discussion, each rowset returned by the DRDA server was assumed to be complete—that is, it contained all rows requested by the QRYROWSET parameter, but rowsets may be either complete or partial. In the following discussion, processing of partial rowsets is considered in the context of an intermediate server. FIG. 6 illustrates a computing environment in which a DRDA client 6 sends DRDA messages to DRDA server 12 by way of an intermediate server 50 and an intermediate DRDA server 52. The intermediate DRDA server 52 and the DRDA server 12 transmit query blocks 56 and 58 respectively, where the number of rows in the query blocks may be different because the blocking limits between the DRDA client 6 and the intermediate DRDA server 52 may be different from the blocking limits between the intermediate DRDA server 52 and the DRDA server 12. In the example described herein, the DRDA client 6 sends a CNTQRY with a QRYROWSET value of S, while the blocking limits allow the DRDA server 12 and the intermediate DRDA server 52 to return partial rowsets of size S1 and S2 respectively (S1<S and S2<S1).

Figure 7:
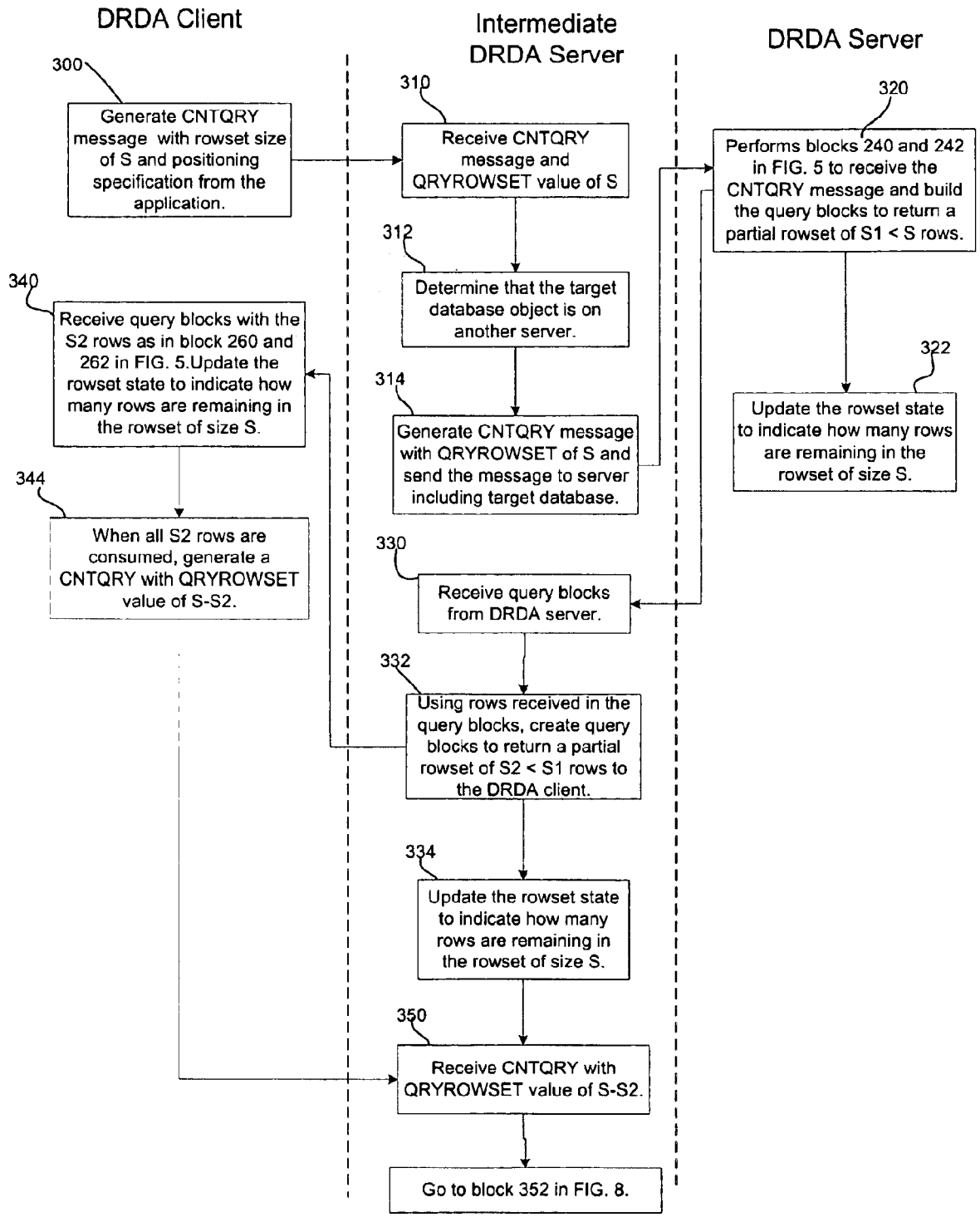
FIGS. 7–8 illustrate logic implemented by the components in the distributed computing environment to return requested data to an application program in accordance with preferred embodiments of the present invention.
Figure 8:
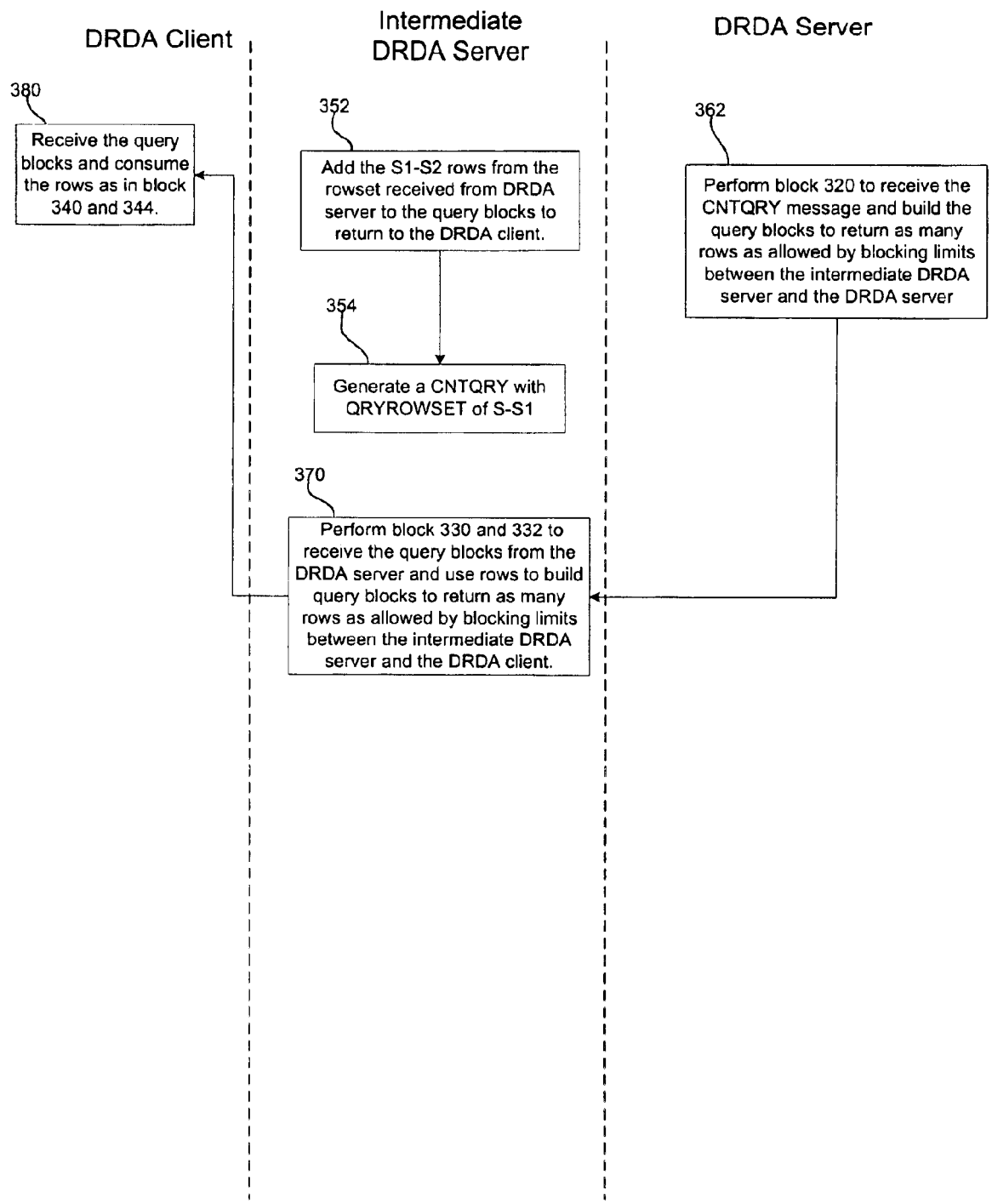

FIGS. 7–8 illustrate the logic implemented by the DRDA client 6, the intermediate DRDA server 52, and the DRDA server 12 when a CNTQRY request with a QRYROWSET value of S results in partial rowsets being returned by the intermediate DRDA server 52 and the DRDA server 12. In FIG. 7 at block 300, the DRDA client 6 generates and sends a CNTQRY message to the intermediate DRDA server 52, specifying a QRYROWSET value of S. In this implementation, the DRDA client 6 wants to retrieve all the S rows in the rowset to return to the application 4, and will fetch all rows from the query blocks received in response to the CNTQRY message. At block 310, the intermediate DRDA server 52 receives the CNTQRY message and the QRYROWSET value of S. At block 312, the intermediate DRDA server 52 determines that the target database object 18 is on another server, and, at block 314, generates a different CNTQRY message with a QRYROWSET value of S to send to the DRDA server 12. The DRDA client 6 does not know that another server will process the CNTQRY message, nor does the intermediate DRDA server 52 know if the DRDA server 12 actually contains the target database object. In this example, it is assumed that the server 10 contains the target database object 18. At block 320, the DRDA server 12 performs blocks 240 and 242 as in FIG. 5, receiving the CNTQRY message from the intermediate DRDA server 52, building the FETCH requests to the target database 16, and generating the query blocks. As in our assumptions, the DRDA server 12 can only return S1<S rows to the intermediate DRDA server 52. At block 330, the intermediate DRDA server 52 receives the query blocks containing the partial rowset from the DRDA server 12 and, for purposes of illustration, stores them in a query block buffer 60. At block 332, the intermediate DRDA server 52 generates query blocks to return to the DRDA client 6. As in our assumptions, the intermediate DRDA sever can only return S2<S1 rows to the DRDA client.

The S2 rows are taken from the query blocks received from the DRDA server 12, leaving S1–S2 rows in the query block buffer 60. At block 340, the DRDA client 6 receives the query blocks from the intermediate DRDA server 52 using the logic as in block 260 and 262 in FIG. 5. Upon fetching all S2 rows in the query blocks received from the intermediate DRDA server 52, the DRDA client 6 will generate (at block 344) another CNTQRY message with QRYROWSET value of S–S2 to retrieve the remaining rows in the pending rowset. At block 350, the intermediate DRDA server 52, receives and validates the CNTQRY message with the QRYROWSET value of S–S2. Since S1–S2 rows were previously received from the DRDA server 12, the intermediate DRDA server 52 adds those rows the query blocks to return to the DRDA client 6 (block 352), then generates a different CNTQRY with a QRYROWSET value of S–S1 to send to the DRDA server 12. At block 362, the DRDA server 12 receives the CNTQRY message and builds the query blocks for the remaining S–S1 rows in the rowset as in block 320 and 322. If all S–S1 rows can be returned, then the rowset is complete, otherwise, the DRDA server 12 just sends the rows up to the block size limit and once again returns a partial rowset.

At block 370, the intermediate DRDA server 52 performs blocks 330 and 334 to receive the query blocks into the query block buffer 60. If all S–S2 rows can be returned, then the rowset is complete, otherwise the intermediate DRDA server 52 just sends the rows it can and once again returns a partial rowset. At block 380, the DRDA client 6 receives the query blocks containing the rows returned in response to its CNTQRY command, performing the logic as in blocks 340 and 344. If all S–S2 rows were not received, then repeat blocks 340 to 380 until this is true. When a DRDA client 6 receives a partial rowset, it either must complete the rowset as described above in FIG. 7–8 or it must reset it by means of a CNTQRY parameter QRYBLKRST.

In the described implementation of FIGS. 7 and 8, S1 is greater than S2. If S2 is greater than S1, then the intermediate site will receive fewer rows from the downstream serving site than it can send to its upstream requesting site. In such case, the intermediate site requests the remainder of the rowset from the downstream serving site. The intermediate site would send a CNTQRY to get more rows from the downstream serving site until it gets the maximum number of S2 rows that it can send.

The described implementations provide an improved method for fetching cursor data in a client/server environment when the cursor presented to the application is capable of only single-row fetch operations, but the underlying client and database system implementation is able to exploit multiple-row network transmissions and perform scrolling operations without frequent network interactions with the server. The described implementations optimize performance of scrollable cursor applications that use a single-row cursor interface (both read-only cursors and updateable cursors) by implementing client/server network protocols that allow the server to send a block of rows on each network transmission (rather than one row at a time for updateable cursors) in order to minimize network traffic by reducing the number of requests. Still further, the described implementations allow the client to resynchronize the cursor position at the server when the client needs a new block of rows in order to reposition the server's current position The addresses the situation where the client may have changed cursor position without previously informing the server about the cursor position change.

Alternative Embodiments and Conclusions

This concludes the description of the preferred embodiments of the invention. The following describes some alternative embodiments for accomplishing the present invention.

The preferred embodiments may be implemented as a method, program using standard programing and/or engineering techniques to produce software, firmware, hardware, or any combination thereof The programs and code defining the functions of the preferred embodiments can be delivered to a computer via a variety of information bearing media, which include, but are not limited to, computer-readable devices, firmware, programmable logic, memory devices (e.g., EEPROMs, ROMs, PROMs, RAMs, SRAMs, etc.) "floppy disk," CD-ROM, a file server providing access to the programs via a network transmission line, wireless transmission media, signals propagating through space, radio waves, infrared signals, etc. Still further the code in which the preferred embodiments are implemented may comprise hardware or electronic devices including logic to process data. Of course, those skilled in the art will recognize that many modifications may be made to this configuration without departing from the scope of the present invention.

The preferred logic of FIGS. 3–5 and 7–9 describe specific operations occurring in a particular order. In alternative embodiments, certain of the logic operations may be performed in a different order, modified or removed and still implement preferred embodiments of the present invention. Morever, steps may be added to the above described logic and still conform to the preferred embodiments. Further, operations described herein may occur sequentially or certain operations may be processed in parallel.

Preferred embodiments were described with respect to a situation where the application issues single row FETCH requests to fetch multiple rows from a cursor table in a DRDA environment. The preferred embodiments may also apply to requests from the application for multiple rows, i.e., when the application supports multiple-row fetching.

Preferred embodiments were described with respect to a computing network environment that utilized the DRDA protocol for SQL requests across a network. However, those skilled in the art will recognize that the preferred embodiments may be implemented in database network protocols other than DRDA.

In summary, the present invention provides a system, method, and program for accessing data in a distributed database environment. A client program receives multiple requests for at least one row of data from a database object satisfying specified search predicates from an application program. Each request includes a request for at least one row from the table satisfying the specified search predicates. The client program transfers a database command and a rowset parameter indicating a maximum number of rows to return to a server program over a network if the requested row is not maintained by the client program. A data block is generated with the server program including rows from the database object satisfying the search predicates in response to the database command. The rows included in the data block do not exceed the rowset parameter. The server program transfers the data block to the client program. In turn, the client program returns at least one requested row from the received data block in response to one request for the at least one row of data from the application program.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for accessing data in a distributed database environment, comprising:

receiving, with a client program, multiple requests for data from a database object satisfying specified search predicates from an application program, wherein each request includes a request for at least one row from the database object;

transferring, with the client program, a database command and a rowset parameter indicating a maximum number of rows to return to a server program over a network if the requested row is not maintained by the client program;

generating a data block with the server program including rows from the database object satisfying the search predicates in response to the database command, wherein the rows included in the data block do not exceed the rowset parameter;

transferring, with the server program, the data block to the client program; and returning, with the client program, at least one requested row from the received data block in response to one request for the at least one row of data from the application program.

2. The method of claim 1, wherein the multiple requests specify orientation information for a row from the database object satisfying the specified search predicates.

3. The method of claim 1, wherein the server program maintains a maximum block size parameter, and wherein the data block is further generated to not exceed the block size parameter.

4. The method of claim 1, wherein the multiple requests received by the client program from the application program comprise single-row fetch requests and the rows from the database object that satisfy the search predicates are returned as part of a scrollable cursor created by the application program.

5. The method of claim 4, further comprising:
maintaining, with the client program, a first pointer addressing a last accessed row from the received data block and a client cursor addressing a last requested row from the scrollable cursor; and
incrementing the client cursor to an entry in the database object corresponding to the last row returned to the application program.

6. The method of claim 5, wherein the server program maintains a server cursor addressing the last row from the database object included in a last data block returned to the client program.

7. The method of claim 6, wherein the client program manages the client cursor to ensure that the correct row is returned from the server in order to satisfy the client requests and wherein the client program is capable of sending a command to the server program to correct the server cursor position.

8. The method of claim 1, wherein the client program and server program communicate using the Distributed Relational Database Architecture (DRDA).

9. The method of claim 1, wherein the search predicates are defined with a database cursor that provides a result table subset of the database object that satisfies the search predicates.

10. The method of claim 8, wherein the database command transferred by the client program comprises an open cursor command.

11. The method of claim 8, wherein the database command transferred by the client program comprises a continued request for rows from an open cursor.

12. The method of claim 1, further comprising:
determining, with the client program, whether the data block includes less rows than the rowset parameter;
determining, with the client program, a difference between the rowset parameter and a number of rows included in the data block if the data block includes less rows than the rowset parameter; and
sending, with the client program, a command to the server program to transmit the difference of rows.

13. A method for accessing data in a distributed database environment, comprising:
receiving, with a client program, multiple requests for at least one row of data from a database object satisfying specified search predicates from an application program, wherein each request includes a request for at least one row from the database object satisfying the specified search predicates;
transferring, with the client program, a database command and a rowset parameter indicating a maximum number of rows to return to a first server program over a network if the requested row is not maintained by the client program;
transferring, with the first server program, a database command and the rowset parameter to a second server program over the network if the requested row is not maintained by the first server program;
generating a first data block with the second server program including rows from the database object satisfying the search predicates in response to the database command, wherein the rows included in the first data block do not exceed the rowset parameter;
transferring, with the second server program, the first data block to the first server program;
generating a second data block with the first server program including rows from the first data block, wherein the rows in the second data block do not exceed the rowset parameter;
transferring, with the first server program, the second data block to the client program; and
returning, with the client program, at least one requested row from the received data block in response to one request for the at least one row of data from the application program.

14. The method of claim 13, wherein the first server program maintains a block limit, wherein a number of rows the first server program includes in the second data block does not exceed the block limit.

15. The method of claim 14, wherein generating the second data block with the first server program from the rows in the first data block comprises:
adding rows from the first data block to the second data block until a size of the second data block reaches one of the rowset parameter or the block limit; and
buffering the rows in the first data block that are not added to the second data block.

16. The method of claim 13, wherein the second server program maintains a block limit, wherein a number of rows the second server program includes in the first data block further does not exceed the block limit.

17. The method of claim 13, wherein the first server program maintains a first block limit and wherein the second data block further does not exceed the first block limit and wherein the second server program maintains a second block limit, wherein the first data block further does not exceed the second block limit.

18. The method of claim 17, wherein the first block limit is greater than the second block limit and both are less than the limit imposed by the rowset parameter and wherein generating the second data block with the first server program from the rows in the first data block comprises:
adding all the rows from the first data block to the second data block, wherein the rows added to the second data block is less than the rowset parameter;
transmitting, with the first server program, a database command to the second server program requesting a shortfall of rows equal to the rowset parameter minus the number of rows added to the second data block; and
receiving, with the first server program, a third data block from the second server program including the shortfall of rows;
adding, with the first server program, rows from the third data block, up to the first block limit, to the pending second data block;
repeating the sending of a database command to the second server program and the receiving of additional rows until the first block limit is satisfied; and
returning the second data block to the client program.

19. The method of claim 18, wherein the first and second block limits are less than the rowset parameter size, further comprising:
  determining, at the client program, that the number of rows in the second data block is less than the rowset parameter size; and
  transmitting, with the client program, a command requesting further rows to include in additional data blocks to send to the client program until the rowset parameter number of rows have been transferred to the client program.

20. The method of claim 19, further comprising:
  transmitting, with the client program, a command to the first server program to clear pending data blocks for the rowset and pending rowset status.

21. The method of claim 19, wherein the first block limit is less than the second block limit and both are less than the limit imposed by the rowset parameter, and wherein generating the second data block with the first server program further comprises:
  adding some of the rows from the first data block to the second data block, up to the first block limit; and
  returning the second data block to the client program, and retaining any unsent rows from the first data block.

22. The method of claim 13, wherein there are additional server programs between the first server program and second server program through which the rows from the database object are transferred.

23. A system for accessing data in a distributed database environment, comprising:
  a computer database including at least one database object;
  a client computer;
  a server computer;
  a network enabling communication between the client computer and server computer;
  a client program executed by the client computer to perform:
    (i) receiving multiple requests for data from a database object satisfying specified search predicates from an application program, wherein each request includes a request for at least one row from the database object;
    (ii) transferring a database command and a rowset parameter indicating a maximum number of rows to return to the server program over a network if the requested row is not maintained by the client program;
  a server program executed by the client computer to perform:
    (i) generating a data block including rows from the database object satisfying the search predicates in response to the database command from the client program, wherein the rows included in the data block do not exceed the rowset parameter;
    (ii) transferring the data block to the client program, wherein the client program returns at least one requested row from the received data block in response to one request for the at least one row of data from the application program.

24. The system of claim 23, wherein the multiple requests specify orientation information for a row from the database object satisfying the specified search predicates.

25. The system of claim 23, wherein the server program maintains a maximum block size parameter, and wherein the data block is further generated to not exceed the block size parameter.

26. The system of claim 23, wherein the multiple requests received by the client program from the application program comprise single-row fetch requests and the rows from the database object that satisfy the search predicates are returned as part of a scrollable cursor created by the application program.

27. The system of claim 26, wherein the client program further performs:
  maintaining a first pointer addressing a last accessed row from the received data block and a client cursor addressing a last requested row from the scrollable cursor; and
  incrementing the client cursor to an entry in the database object corresponding to the last row returned to the application program.

28. The system of claim 27, wherein the server program maintains a server cursor addressing the last row from the database object included in a last data block returned to the client program.

29. The system of claim 28, wherein the client program manages the client cursor to ensure that the correct row is returned from the server in order to satisfy the client requests and wherein the client program is capable of sending a command to the server program to correct the server cursor position.

30. The system of claim 23, wherein the client program and server program communicate using the Distributed Relational Database Architecture (DRDA).

31. The system of claim 23, wherein the search predicates are defined with a database cursor that provides a result table subset of the database object that satisfies the search predicates.

32. The system of claim 31, wherein the database command transferred by the client program comprises an open cursor command.

33. The system of claim 31, wherein the database command transferred by the client program comprises a continued request for rows from an open cursor.

34. The system of claim 23, wherein the client program further performs:
  determining whether the data block includes less rows than the rowset parameter;
  determining a difference between the rowset parameter and a number of rows included in the data block if the data block includes less rows than the rowset parameter; and
  sending a command to the server program to transmit the difference of rows.

35. A system for accessing data in a distributed database environment, comprising:
  a distributed computing environment including at least one client program, first server program, second server program, and at least one database object;
  a network enabling communication among the client program, first server program, and second server program;
  means, performed by the client program, for receiving multiple requests for at least one row of data from a database object satisfying specified search predicates from an application program, wherein each request includes a request for at least one row from the database object satisfying the specified search predicates;
  means, performed by the client program, for transferring a database command and a rowset parameter indicating a maximum number of rows to return to the first server program over the network if the requested row is not maintained by the client program;

means, performed by the first server program, for transferring a database command and the rowset parameter to the second server over the network if the requested row is not maintained by the first server program;

means, performed by the second server program, for generating a first data block including rows from the database object satisfying the search predicates in response to the database command from the first server program, wherein the rows included in the first data block do not exceed the rowset parameter;

means, performed by the second server program, for transferring the first data block to the first server program;

means, performed by the first server program, for generating a second data block including rows from the first data block, wherein the rows in the second data block do not exceed the rowset parameter;

means, performed by the first server program, for transferring the second data block to the client program; and means, performed by the client program, for returning at least one requested row from the received data block in response to one request for the at least one row of data from the application program.

36. The system of claim 35, wherein the first server program maintains a block limit, wherein a number of rows the first server program includes in the second data block does not exceed the block limit.

37. The system of claim 36, wherein the means for generating the second data block with the first server program from the rows in the first data block further performs:

adding rows from the first data block to the second data block until a size of the second data block reaches one of the rowset parameter or the block limit; and buffering the rows in the first data block that are not added to the second data block.

38. The system of claim 35, wherein the second server program maintains a block limit, wherein a number of rows the second server program includes in the first data block further does not exceed the block limit.

39. The system of claim 35, wherein the first server program maintains a first block limit and wherein the second data block further does not exceed the first block limit and wherein the second server program maintains a second block limit, wherein the first data block further does not exceed the second block limit.

40. The system of claim 39, wherein the first block limit is greater than the second block limit and both are less than the limit imposed by the rowset parameter, and wherein the means for generating the second data block with the first server program from the rows in the first data block performs:

adding all the rows from the first data block to the second data block, wherein the rows added to the second data block is less than the rowset parameter;

transmitting, with the first server program, a database command to the second server program requesting a shortfall of rows equal to the rowset parameter minus the number of rows added to the second data block;

receiving, with the first server program, a third data block from the second server program including the shortfall of rows;

adding rows from the third data block, up to the first block limit, to the pending second data block;

repeating the sending of a database command to the second server program and the receiving of additional rows until the first block limit is satisfied; and returning the second data block to the client program.

41. The system of claim 40, wherein the first and second block limits are less than the rowset parameter size, further comprising:

means, performed by the client program, for determining whether the number of rows in the second data block is less than the rowset parameter size; and means, performed by the first client program, for transmitting a command requesting further rows to include in additional data blocks to send to the client program until the rowset parameter number of rows have been transferred to the client program.

42. The system of claim 41, further comprising:

means, performed by the client program, for transmitting a command to the first server program to clear pending data blocks for the rowset and pending rowset status.

43. The system of claim 41, wherein the first block limit is less than the second block limit and both are less than the limit imposed by the rowset parameter, and wherein the means for generating the second data block with the first server program further performs:

adding some of the rows from the first data block to the second data block, up to the first block limit; and returning the second data block to the client program, and retaining any unsent rows from the first data block.

44. The system of claim 35, further comprising additional server programs between the first server program and second server program through which the rows from the database object are transferred.

45. Multiple computer readable media including instructions in a client program and server program that communicate over a network to cause computers to enable access to data in a distributed database environment by:

receiving, with the client program, multiple requests for data from a database object satisfying specified search predicates from an application program, wherein each request includes a request for at least one row from the database object;

transferring, with the client program, a database command and a rowset parameter indicating a maximum number of rows to return to the server program over a network if the requested row is not maintained by the client program;

generating a data block with the server program including rows from the database object satisfying the search predicates in response to the database command, wherein the rows included in the data block do not exceed the rowset parameter;

transferring, with the server program, the data block to the client program; and returning, with the client program, at least one requested row from the received data block in response to one request for the at least one row of data from the application program.

46. The multiple computer readable media of claim 45, wherein the multiple requests specify orientation information for a row from the database object satisfying the specified search predicates.

47. The multiple computer readable media of claim 45, wherein the server program maintains a maximum block size parameter, and wherein the data block is further generated to not exceed the block size parameter.

48. The multiple computer readable media of claim 45, wherein the multiple requests received by the client program from the application program comprise single-row fetch requests and the rows from the database object that satisfy the search predicates are returned as part of a scrollable cursor created by the application program.

49. The multiple computer readable media of claim 48, further comprising:
maintaining, with the client program, a first pointer addressing a last accessed row from the received data block and a client cursor addressing a last requested row from the scrollable cursor; and
incrementing the client cursor to an entry in the database object corresponding to the last row returned to the application program.

50. The multiple computer readable media of claim 49, wherein the server program maintains a server cursor addressing the last row from the database object included in a last data block returned to the client program.

51. The multiple computer readable media of claim 50, wherein the client program manages the client cursor to ensure that the correct row is returned from the server in order to satisfy the client requests and wherein the client program is capable of sending a command to the server program to correct the server cursor position.

52. The multiple computer readable media of claim 45, wherein the client program and server program communicate using the Distributed Relational Database Architecture (DRDA).

53. The multiple computer readable media of claim 45, wherein the search predicates are defined with a database cursor that provides a result table subset of the database object that satisfies the search predicates.

54. The multiple computer readable media of claim 52, wherein the database command transferred by the client program comprises an open cursor command.

55. The multiple computer readable media of claim 45, further comprising
determining, with the client program, whether the data block includes less rows than the rowset parameter;
determining, with the client program, a difference between the rowset parameter and a number of rows included in the data block if the data block includes less rows than the rowset parameter; and
sending, with the client program, a command to the server program to transmit the difference of rows.

56. Multiple computer readable media including instructions in a client program, first server program, and second server program that communicate over a network to cause computers to enable access to data in a network distributed database environment by:
receiving, with the client program, multiple requests for at least one row of data from a database object satisfying specified search predicates from an application program, wherein each request includes a request for at least one row from the database object satisfying the specified search predicates;
transferring, with the client program, a database command and a rowset parameter indicating a maximum number of rows to return to the first server program over a network if the requested row is not maintained by the client program;
transferring, with the first server program, a database command and the rowset parameter to a second server program over the network if the requested row is not maintained by the first server program;
generating a first data block with the second server program including rows from the database object satisfying the search predicates in response to the database command, wherein the rows included in the first data block do not exceed the rowset parameter;
transferring, with the second server program, the first data block to the first server program;
generating a second data block with the first server program including rows from the first data block, wherein the rows in the second data block do not exceed the rowset parameter;
transferring, with the first server program, the second data block to the client program; and
returning, with the client program, at least one requested row from the received data block in response to one request for the at least one row of data from the application program.

57. The multiple computer readable media of claim 56, wherein the first server program maintains a block limit, wherein a number of rows the first server program includes in the second data block does not exceed the block limit.

58. The multiple computer readable media of claim 57, wherein generating the second data block with the first server program from the rows in the first data block comprises:
adding rows from the first data block to the second data block until a size of the second data block reaches one of the rowset parameter or the block limit; and
buffering the rows in the first data block that are not added to the second data block.

59. The multiple computer readable media of claim 56, wherein the second server program maintains a block limit, wherein a number of rows the second server program includes in the first data block further does not exceed the block limit.

60. The multiple computer readable media of claim 56, wherein the first server program maintains a first block limit and wherein the second data block further does not exceed the first block limit and wherein the second server program maintains a second block limit, wherein the first data block further does not exceed the second block limit.

61. The multiple computer readable media of claim 60, wherein the first block limit is greater than the second block limit and both are less than the limit imposed by the rowset parameter, and wherein generating the second data block with the first server program from the rows in the first data block comprises:
adding all the rows from the first data block to the second data block, wherein the rows added to the second data block is less than the rowset parameter;
transmitting, with the first server program, a database command to the second server program requesting a shortfall of rows equal to the rowset parameter minus the number of rows added to the second data block;
receiving, with the first server program, a third data block from the second server program including the shortfall of rows;
adding, with the first server program, rows from the third data block, up to the first block limit, to the pending second data block;
repeating the sending of a database command to the second server program and the receiving of additional rows until the first block limit is satisfied; and
returning the second data block to the client program.

62. The multiple computer readable media of claim 55, wherein the first and second block limits are less than the rowset parameter size, further comprising:
determining, at the client program, that the number of rows in the second data block is less than the rowset parameter size; and
transmitting, with the client program, a command requesting further rows to include in additional data blocks to send to the client program until the rowset parameter number of rows have been transferred to the client program.

63. The multiple computer readable media of claim 62, further comprising:

transmitting, with the client program, a command to the first server program to clear pending data blocks for the rowset and pending rowset status.

64. The multiple computer readable media of claim 62, wherein the first block limit is less than the second block limit and both are less than the limit imposed by the rowset parameter, and wherein generating the second data block with the first server program further comprises:

adding some of the rows from the first data block to the second data block, up to the first block limit; and returning the second data block to the client program, and retaining any unsent rows from the first data block.

\* \* \* \* \*

UNITED STATES PATENT AND TRADEMARK OFFICE
CERTIFICATE OF CORRECTION

PATENT NO. : 6,990,477 B2
APPLICATION NO. : 09/819476
DATED : January 24, 2006
INVENTOR(S) : Curt Lee Cotner and Margaret A. Dong It is certified that error appears in the above-identified patent and that said Letters Patent is hereby corrected as shown below:

Column 12, line 64, paragraph should end with "...client program; and" and insert new paragraph beginning with --returning, with the client program...--.

Signed and Sealed this

Twenty-second Day of May, 2007

JON W. DUDAS
*Director of the United States Patent and Trademark Office*